No. 755,278. Patented March 22, 1904.

UNITED STATES PATENT OFFICE.

WILLIAM Y. CRUIKSHANK, OF FREELAND, PENNSYLVANIA, ASSIGNOR OF ONE-HALF TO NIXON MALEY, OF FREELAND, PENNSYLVANIA.

MANUFACTURE OF ARTIFICIAL-FUEL BLOCKS.

SPECIFICATION forming part of Letters Patent No. 755,278, dated March 22, 1904.

Application filed February 6, 1903. Serial No. 142,161. (No specimens.)

*To all whom it may concern:*

Be it known that I, WILLIAM Y. CRUIKSHANK, a citizen of the United States, residing at Freeland, in the county of Luzerne and State of Pennsylvania, have invented a new and useful Manufacture of Artificial-Fuel Blocks, of which the following is a specification.

My invention relates to the manufacture of artificial-fuel blocks; and it consists in the improved process of manufacture hereinafter described.

The object of this invention is to produce an artificial-fuel block in which the principal constituent is anthracite culm, which shall be cheap in manufacture, which will form a satisfactory fuel, and which may be kept indefinitely after preparation.

The manner of manufacturing my improved fuel compound is as follows: The culm in a slightly-damp but not wet state is thoroughly mixed with two per cent. of resin-dust, and to that mixture is then added and thoroughly incorporated therewith four per cent. of asphalt diluted with benzin or other suitable solvent to about the consistency of cream. The product is then pressed in hot dies of suitable size and shape until the moisture present in the culm and the solvent of the asphalt have both become vaporized and the resin-dust has been melted. The blocks of fuel compound formed in this way are then allowed to cool, and the melted resin hardens and forms with the asphalt means for imparting solidity and firmness to the mass.

The dies between which the blocks of fuel compound are pressed are preferably heated by steam to prevent ignition of the compound or the solvent of the asphalt which is vaporized during this portion of the process; but, if preferred, the mixture can be pressed between cool dies and afterward heated in a kiln or other suitable heater to evaporate the moisture and solvent and melt the resin.

The object of mixing the resin-dust with moist culm is to insure an intimate mixture of the particles and adhesion of the resin-dust to the culm. Before the asphalt is mixed with the previously-formed mixture of resin-dust and culm it is reduced to the consistency of cream in order to insure its perfect incorporation with the other ingredients.

The fuel compound resulting from the mixture and subsequent treatment of the substances above mentioned contains a high percentage of anthracite-coal culm, and hence there is but little smoke. It contains no ingredient that undergoes destructive decomposition. It retains the form imparted to the composition by pressure in the dies and is in every respect a satisfactory fuel.

Having thus described my invention, what I claim as new, and desire to secure by Letters Patent, is—

The process of making artificial-fuel blocks, consisting in thoroughly intermingling, in suitable proportions, slightly-moist anthracite-coal culm and dry pulverized resin, incorporating with the mixture a quantity of asphalt rendered fluid by means of a volatile solvent, then subjecting the product in suitable masses to the simultaneous action of heat and pressure until the moisture and the solvent of the asphalt have been vaporized and the resin has been melted.

In testimony that I claim the foregoing as my own I have hereto affixed my signature in the presence of two witnesses.

W. Y. CRUIKSHANK.

Witnesses:
G. MALEY,
CHAS. ORION STROH.